July 25, 1933. H. A. DOUGLAS 1,919,209
SWITCHING MECHANISM FOR AUTOMOTIVE VEHICLES
Filed Jan. 25, 1930 2 Sheets-Sheet 1
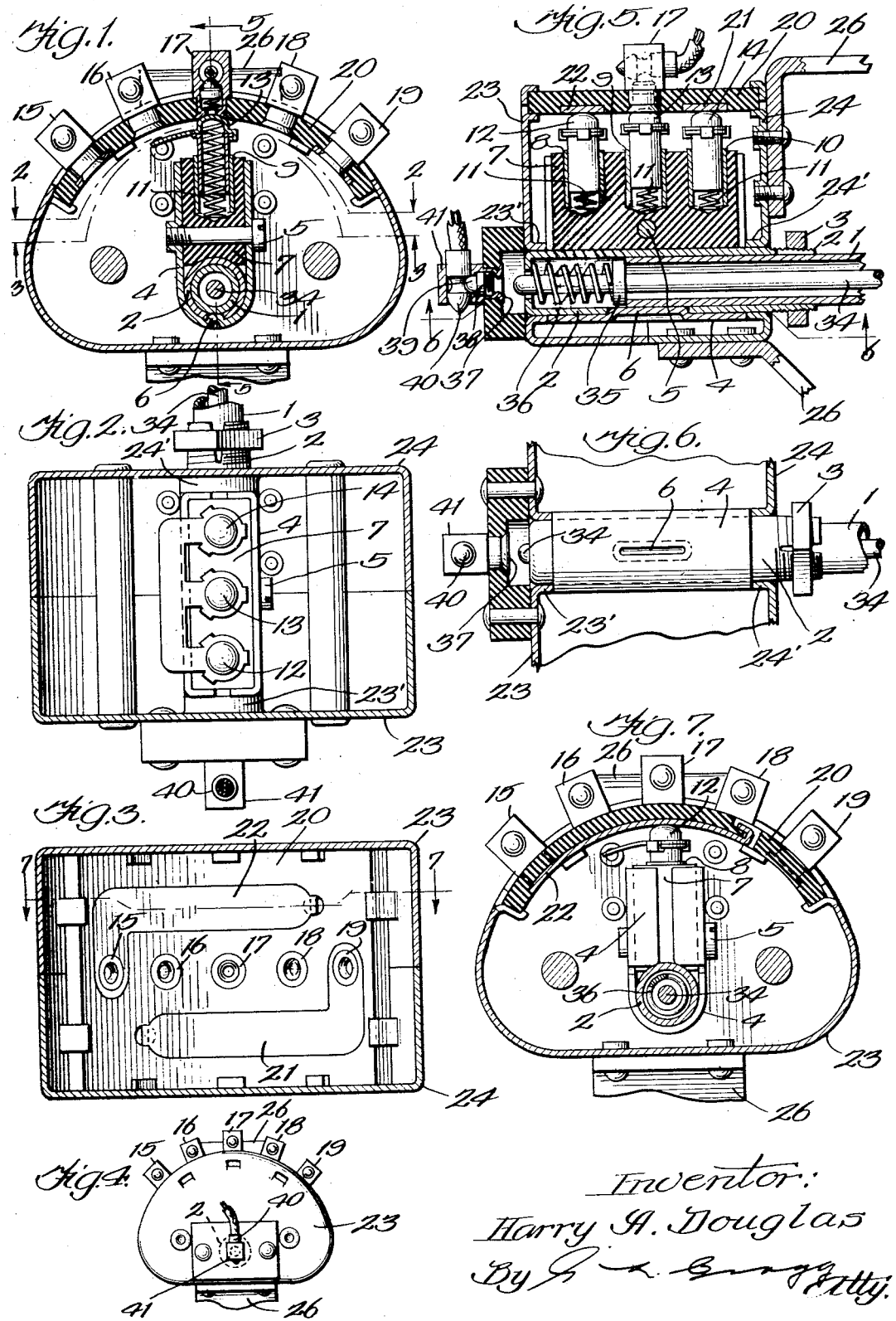
Inventor:
Harry A. Douglas

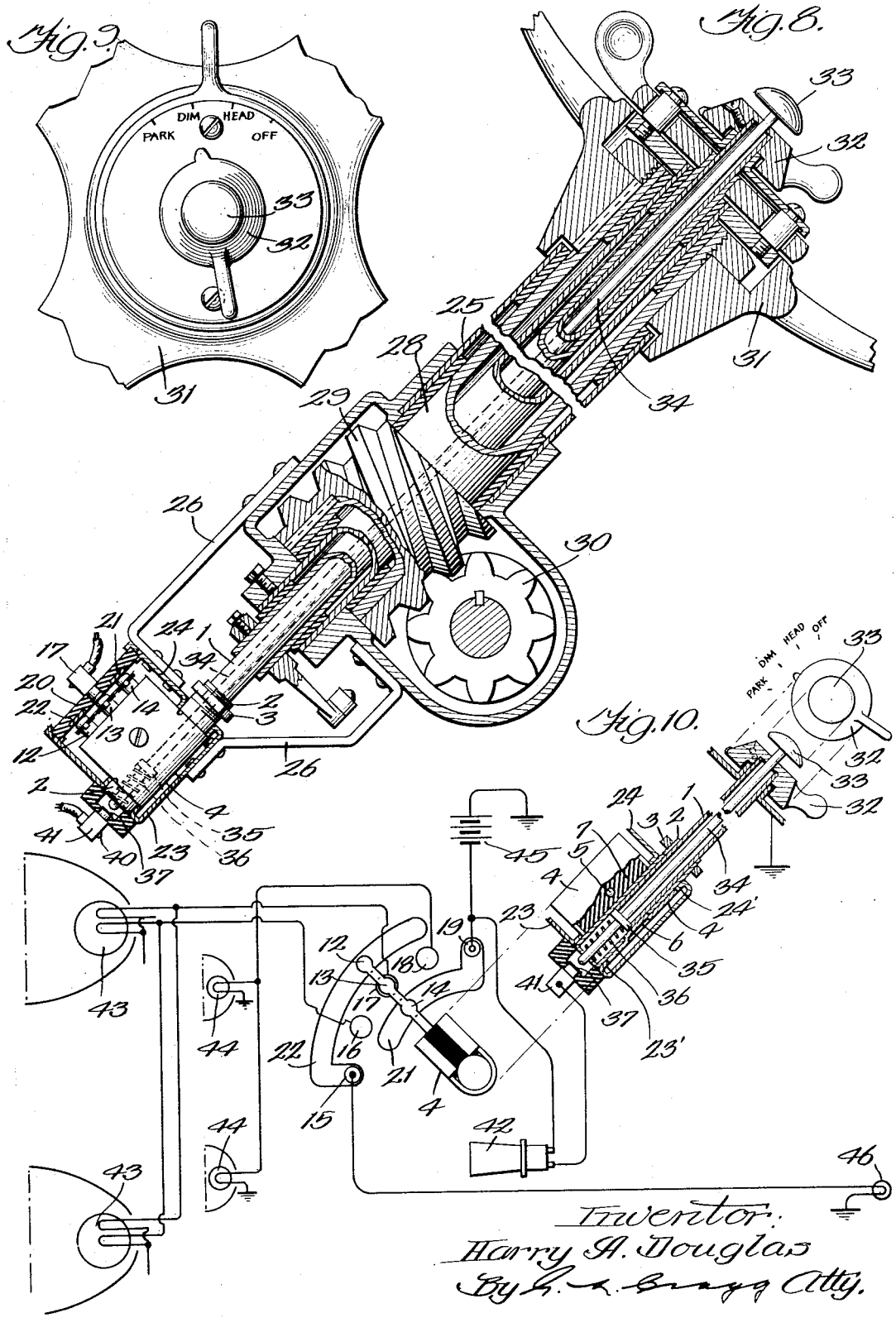

Patented July 25, 1933

1,919,209

UNITED STATES PATENT OFFICE

HARRY A. DOUGLAS, OF BRONSON, MICHIGAN

SWITCHING MECHANISM FOR AUTOMOTIVE VEHICLES

Application filed January 25, 1930. Serial No. 423,415.

My invention relates to automotive vehicles and electrical circuits associated therewith. In carrying out my invention I assemble the switching mechanism controlling the circuits of an automotive vehicle with the lower end of the stationary steering column and in a position to be free from access of foreign matter. I provide a casing for the switching mechanism, this casing being located upon the upper side of the steering column axis and the upper side of the switch operating shaft that passes through the steering column and steering shaft. This casing is desirably inclusive of an arcuate contact carrying wall portion which is coaxial with the switch operating shaft that carries the contact or contacts that are complementary to contacts upon this wall portion. The switch operating shaft is hollow and encloses the shank of a push button whose head is above the hand operated steering wheel. The steering button shank may be metallic to form a part of the electromagnetic horn circuit. It extends through the above switch casing into cooperative relation with a horn circuit contact which said shank preferably engages when the button is depressed. The switch operating shaft is turned to control the lighting circuits, the horn circuit being established with this shaft in any position.

The invention will be more fully explained in connection with the accompanying drawings in which Fig. 1 is a cross sectional view illustrating the preferred form of switching mechanism; Fig. 2 is a sectional view on line 2—2 of Fig. 1; Fig. 3 is a sectional view on line 3—3 of Fig. 1; Fig. 4 is an end view; Fig. 5 is a sectional view on line 5—5 of Fig. 1; Fig. 6 is a sectional view on line 6—6 of Fig. 5; Fig. 7 is a sectional view on line 7—7 of Fig. 3; Fig. 8 is a longitudinal sectional view taken throughout the length of the steering column with a portion of a column and contiguous parts broken away for lack of space, some parts being shown in elevation; Fig. 9 is an end view taken in the region of the hand operated steering wheel; and Fig. 10 is a diagrammatic illustration of one circuit arrangement.

The switch operating mechanism illustrated is inclusive of a rotatable inclined metallic switch actuating shaft 1 having a tubular metallic extension 2 receiving the lower end of the shaft 1 and which is clamped into assembly with this shaft by means of a clamping nut 3 which is screwed upon the tapered longitudinally split end portion of the sleeve 2 where this sleeve surrounds said shaft. A contact actuating U shaped clip 4 embraces the sleeve 2. A clamping screw 5 is passed through the sides of the clip and is screw threaded into the side of the clip that is remote from the head of the screw, whereby the clip is gripped upon the sleeve to be turned therewith as the shaft 1 is turned. The base of the clip is desirably formed with a key 6 which is tightly received in an opening formed through the sleeve 2, whereby rotation of the clip is further assured when the sleeve 2 and shaft 1 are turned. An insulating contact carrying block 7 is clamped between the sides of the clip 4 by the screw 5. The position of this block is further assured by causing the screw to pass through the block and also by forming an arcuate face in the bottom of the block which conforms in curvature to and receives the sleeve 2. This block carries a series of spring barrels 8, 9 and 10 which are distributed along the sleeve 2 and shaft 1 in the same plane and which are radial with respect to said sleeve and shaft. Coiled springs 11 are disposed in said spring barrels and enter the cylindrical continuations of contacts 12, 13 and 14 of the switching mechanism. These springs press these contacts radially outward and against the contacts 15, 16, 17, 18 and 19 or directly against the arcuate casing wall 20 which carries the latter contacts. The contacts 15, 16, 17, 18 and 19 are all engageable by the contact 13 being arranged in a plane transverse to the axis of the sleeve 2 and shaft 1. The contacts 15 and 19 are provided with continuations 21 and 22 which are positioned to be engageable by the contacts 14 and 12, respectively. The arcuate switch casing wall 20 is fixedly assembled with and between the switch casing walls 23 and 24. The U shaped clip 4 is snugly received at its ends between inward bearing continuations 23', 24' of the casing walls 23, 24 in which sleeve 2 turns with shaft 1. Such clip serves, through the intermediation of the key 6 thereon, to hold the switch casing in assembly with the shaft 1. Rotary and longitudinal movements of the casing is prevented by means of brackets 26 which assemble the switch casing and inclined steering column 25.

The switch operating shaft 1 passes through the interior of a hollow inclined steering shaft 28. This steering shaft carries a worm 29 which is in mesh with a wheel 30 that is in controlling relation with the front steering vehicle wheels, in the case of land vehicles or other steering mechanism in the case of other vehicles. The hollow steering shaft 28 carries a hand operated steering wheel 31 at its upper end. The switch actuating shaft 1 passes through the steering shaft 28 and beyond the upper end of the steering shaft and above the steering wheel 31. A lever 32 is coupled with the shaft 1, whereby this shaft may be turned to adjust the lighting circuits of the automotive vehicle.

I employ a push button for controlling the horn circuit. This push button has its head 33 located above the hub of the lever 32. The shank 34 of the push button is a long grounded metallic rod which passes entirely through the shaft 1. This push button shank has a flange or collar 35 thereon. A coiled spring 36 surrounds the lower end of the push button shank and is bottomed upon the end wall of the tubular extension 2 of the shaft 1. This spring normally presses the collar 35 against the lower end of the shaft 1, whereby the push button is normally placed in its upper position. When the push button is depressed the rod 34, which extends through the tubular metallic extension 2, is brought into engagement, at its lower end, with a spring barrel contact 37, whereby the horn circuit is closed. This spring barrel contact houses a coiled spring 38 which presses a contact 39 outwardly into position to be engaged by a connecting plug 40 when this plug is inserted within a block continuation 41 of the spring barrel.

The circuits that are establishable are diagrammatically illustrated in Fig. 10 which illustrates the horn 42, the head lamps 43, the parking lamps 44, the tail lamp 46 and the grounded battery 45 which is included in circuit with these instrumentalities or excluded from circuit therewith according to the adjustments of the manually operable switching members pertaining thereto. The circuit control is clearly illustrated and it is believed that a further description thereof will not be essential. The switching mechanism is located above the common axis of the inclined steering column and steering shaft, the arcuate wall 20 of the casing for the switching mechanism being coaxial with said column and shaft. Access of foreign matter to the switching mechanism is then effectively guarded against.

The hollow steering shaft 28 is illustrated as enclosing other controlling shafts which do not enter into the present invention, a description thereof being, therefore unnecessary.

Changes may be made without departing from the invention.

Having thus described my invention, I claim:

1. In a switching mechanism, the combination with a casing; of a sleeve rotatable in the casing, said sleeve having a wall at one end thereof; a hollow shaft in said sleeve but terminating short of the walled end thereof, the shaft being fixed to the sleeve; a shank movable longitudinally in the shaft and extending through said end wall to engage a contact fixed with respect to the casing; a flange on the shank located between the end wall and the end of the hollow shaft adjacent said wall; and a spring between said wall and said flange tending to retract the shank to separate the shank and the contact.

2. In a switching mechanism, the combination with a casing; of a sleeve rotatable in the casing, said sleeve having a wall at one end thereof; a hollow shaft in said sleeve but terminating short of the walled end thereof, the shaft being fixed to the sleeve; a shank movable longitudinally in the shaft and extending through said end wall to engage a contact fixed with respect to the casing; a flange on the shank located between the end wall and the end of the hollow shaft adjacent said wall; a spring between said wall and said flange tending to retract the shank to separate the shank and the contact; and a contact carrier on said sleeve within said casing and keyed to rotate with said sleeve.

HARRY A. DOUGLAS.